March 10, 1970 K. S. BARKER ET AL 3,500,470

ELECTRONIC DISPLAY SYSTEMS

Filed Feb. 8, 1967 6 Sheets-Sheet 1

Inventors
K. S. BARKER
F. FENSOME
By
Cameron, Kerkam & Sutton
Attorneys

Inventors
K. S. BARKER
F. FENSOME
By
Cameron, Kerkam & Sutton
Attorneys

Inventors
K. S. BARKER
F. FENSOME
By
Cameron Kerkam & Sutton
Attorneys

Inventors
K. S. BARKER
F. FENSOME
By
Cameron, Kerkam & Sutton
Attorneys

Inventors
K. S. BARKER
F. FENSOME
By Cameron, Kerkam & Sutton
Attorneys

March 10, 1970 K. S. BARKER ET AL 3,500,470

ELECTRONIC DISPLAY SYSTEMS

Filed Feb. 8, 1967 6 Sheets-Sheet 6

Inventors
K. S. BARKER
F. FENSOME
By
Cameron, Kerkam & Sutton
Attorneys 3,500,470
Patented Mar. 10, 1970

3,500,470

ELECTRONIC DISPLAY SYSTEMS

Keith S. Barker, Alderley Edge, and Frank Fensome, Macclesfield, England, assignors to Ferranti, Limited, Hollinwood, England, a company of Great Britain and Northern Ireland Filed Feb. 8, 1967, Ser. No. 614,717
Claims priority, application Great Britain, Feb. 8, 1966, 5,529/66
Int. Cl. H04n *1/24*
U.S. Cl. 340—324 12 Claims

ABSTRACT OF THE DISCLOSURE

An electronic display system in which characters are defined by blocks of information held in a first storage means the initial addresses of the blocks of the characters to be displayed being held in a second storage means, and in which control means cyclically read into a decoding means the required blocks of information from the first storage means in accordance with the addresses contained in the second storage means to cause the display of the desired characters on a cathode-ray tube.

This invention relates to electronic display systems.

Electronic display systems in which information is displayed on a cathode-ray tube are being used in an increasing number of applications. The characters to be displayed by such systems may be alphanumeric characters or symbols of other kinds, such as, for example, electronic circuit elements.

Several methods are known for forming the characters to be displayed. Some systems use special cathode-ray tubes incorporating complex electron guns or shadow masks and such systems suffer from the disadvantage that replacement cathode-ray tubes are very expensive. Other systems are known in which the characters are formed by combining Lissajous figures and it is also known to provide a separate generator for each character to be displayed.

All of the known systems, however, suffer from the disadvantage that the range of characters to be displayed may not readily be changed.

It is an object of the present invention to provide an electronic display system in which the range of characters to be displayed may readily be changed.

According to the present invention an electronic display system comprises a cathode-ray tube, a first addressable storage means for storing blocks of digital information, each of said blocks comprising information defining a character to be displayed, a second storage means for storing the initial address of each of said blocks of information defining the characters which it is desired to display, said first and second storage means being of a kind such that the information stored may readily be changed, decoding means for converting digital information into deflection signals for controlling the deflection of the beam of said cathode-ray tube, and means for cyclically reading into said decoding means the required blocks of information from said first storage means in accordance with the addresses contained in said second storage means to cause the display of the desired characters.

Figure 1:
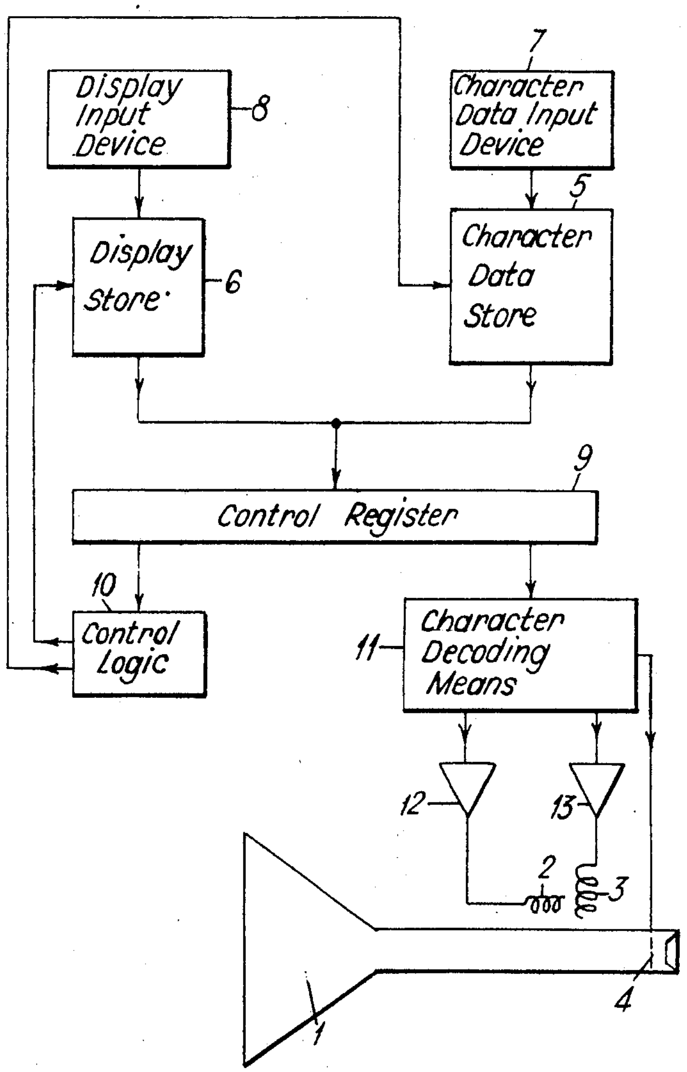
Figure 2:
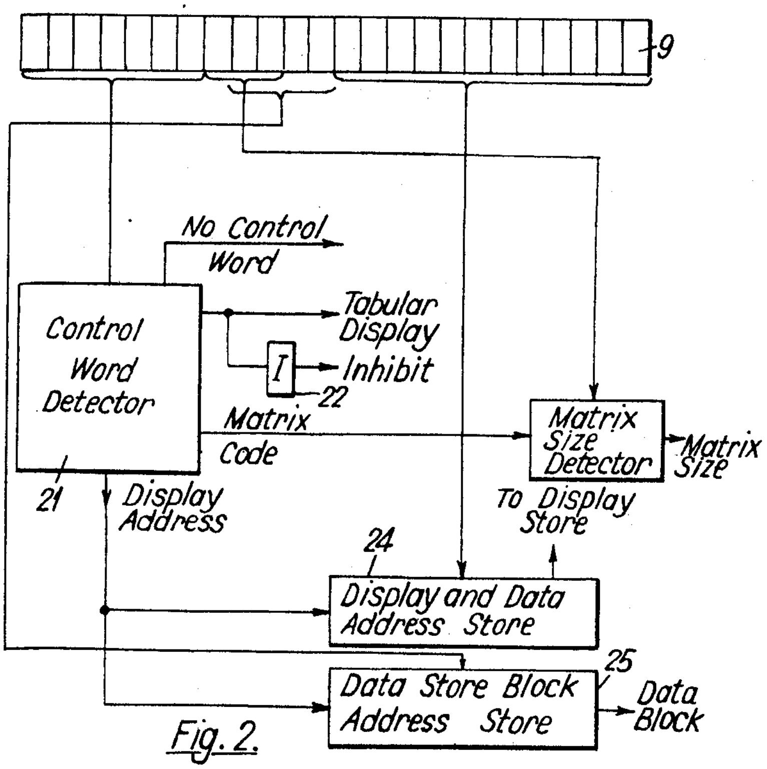
Figure 3:
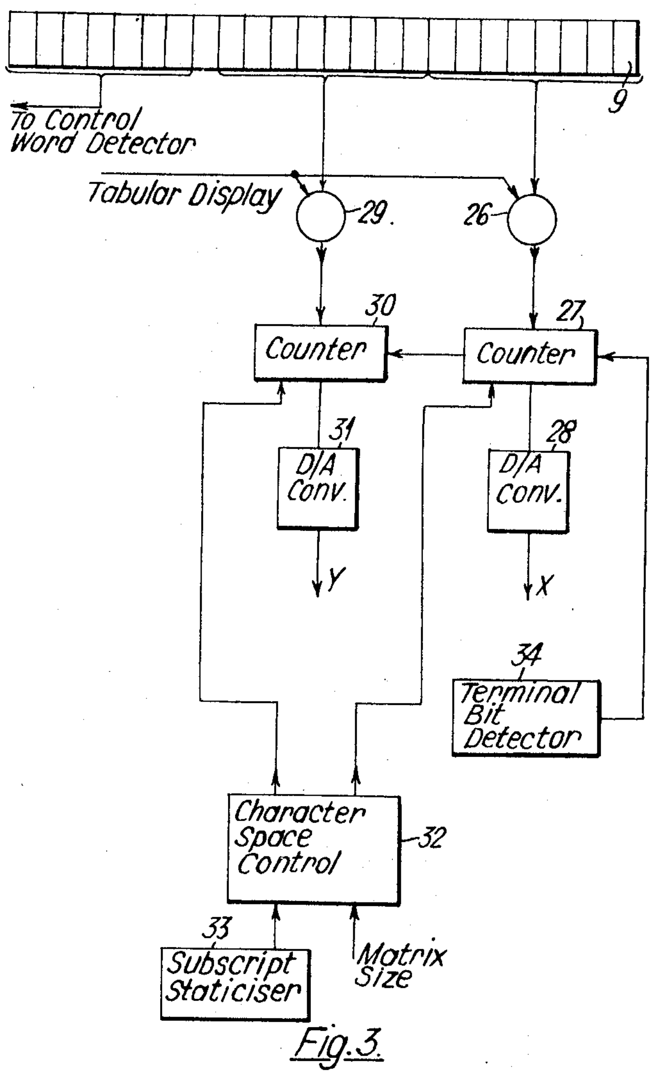
Figure 4:
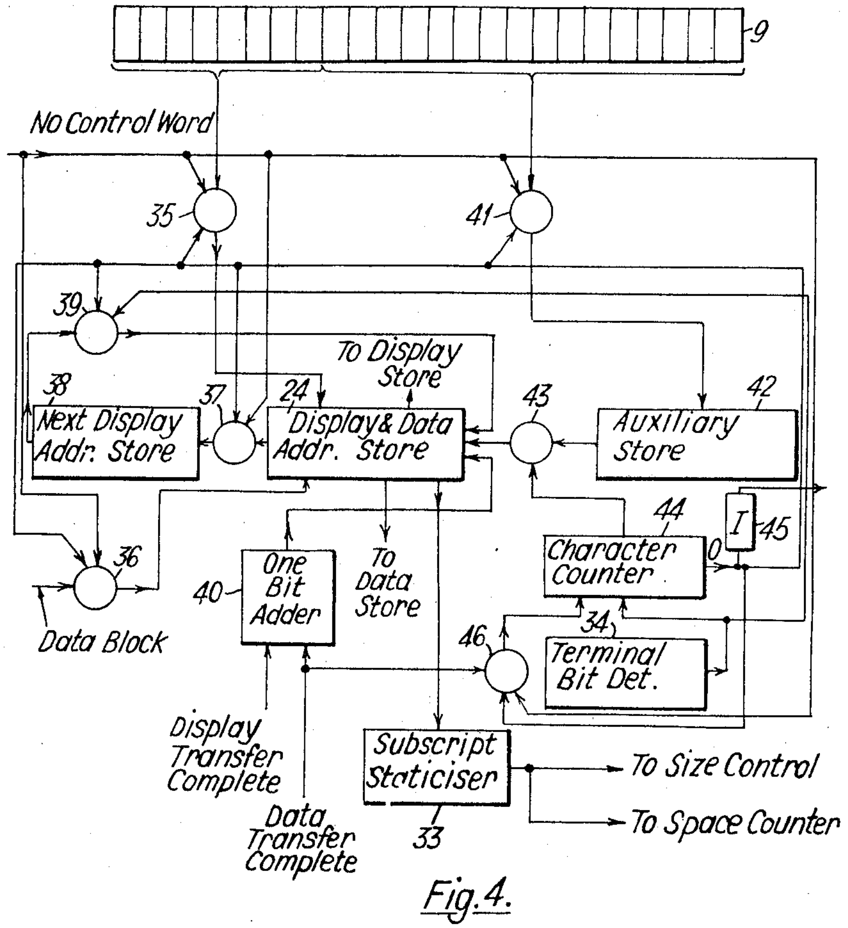
Figure 9:
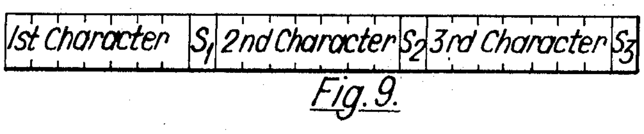
Figure 5:
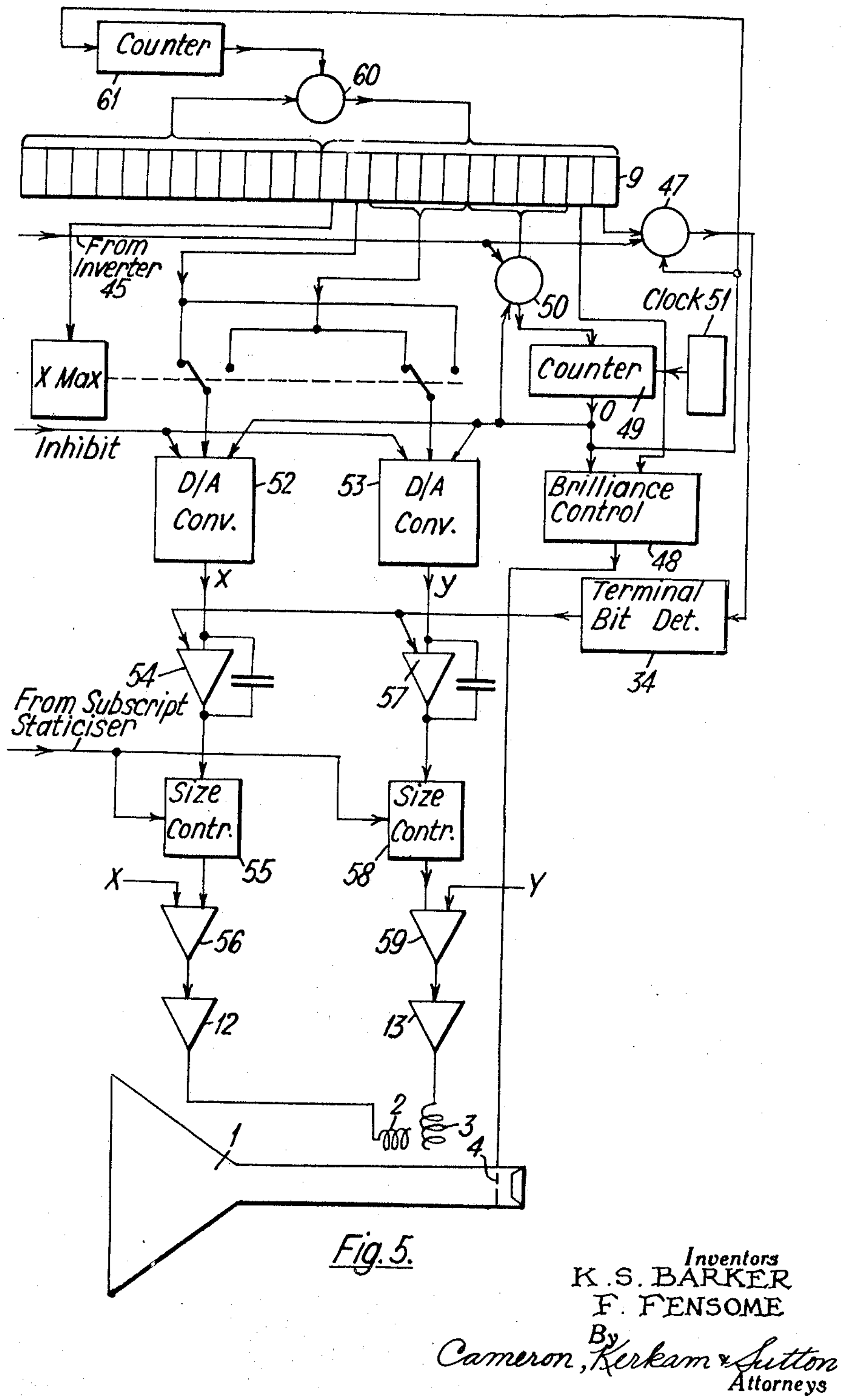
Figure 10:
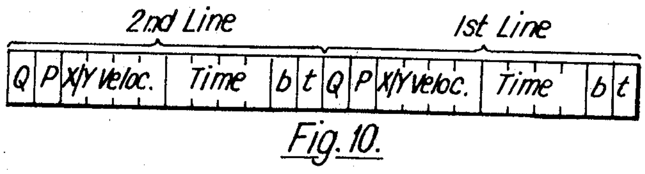
Figure 11:
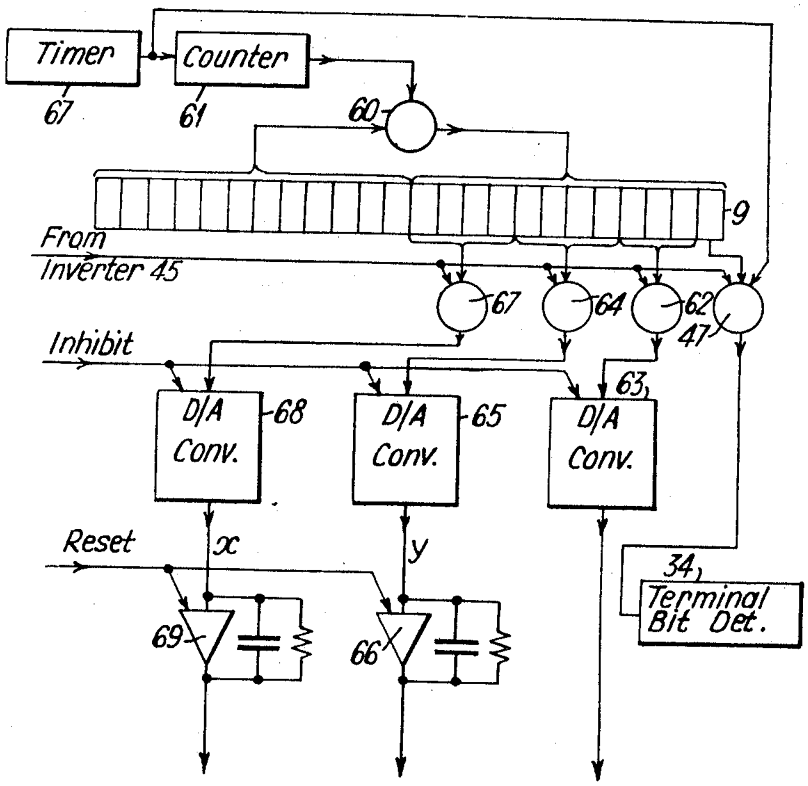
Figure 12:
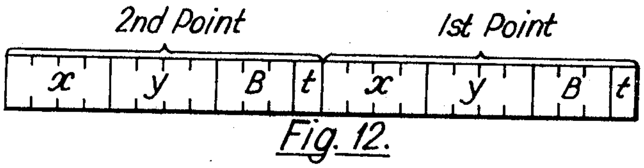

The present invention will now be described by way of example with reference to the accompanying drawings in which:

FIGURE 1 is a simplified block diagram of an electronic display system in accordance with the invention, FIGURES 2, 3 and 4 are block diagrams of the control logic shown in FIGURE 1, FIGURE 5 is a block diagram of the character decoding means shown in FIGURE 1, FIGURES 6, 7, 8, 9 and 10 show twenty-four bit words used in the control register shown in FIGURE 1, FIGURE 11 is a block diagram of a modified form of character decoding means shown in FIGURE 5, and FIGURE 12 shows a twenty-four bit word used in the control register shown in FIGURE 11.

Referring now to FIGURE 1 of the drawings the electronic display system shown includes a cathode-ray tube 1 having the usual scan coils 2, 3 and a brightness control grid 4. The system also includes a first storage means 5 comprising a core store adapted to store blocks of digital information in the form of twenty-four bit words, each block comprising information defining a single character to be displayed in a manner hereafter described. The system further includes a second storage means 6 also adapted to store digital information in the form of twenty-four bit words defining the initial addresses of required blocks of information contained in the store 5. Input devices 7 and 8 are provided for reading information into the stores 5 and 6 respectively. The output from each of the stores 5 and 6 is connected to a control register 9 the output of which is connected to control logic 10 and character decoding means 11, the latter having outputs connected to two scan amplifiers 12, 13 the outputs of which are connected to the scan coils 2, 3 of the cathode-ray tube 1.

In operation of the system characters are drawn as a series of straight lines joining points on the character outline. The number of lines required to draw a character is not held constant and to draw alphanumeric characters, for example, the number of lines for different characters may vary from two to twenty-seven. Similarly, the length of each line is not held constant and in the more detailed description to follow the system described allows the drawing of lines having one of 16 possible lengths drawn at one of fifty-six possible angles.

The information containing the data defining each character to be drawn is written into the store 5 by means of the character data input device 7 which typically is a computer. Thereafter, the display input device 8, which may also be a computer or a suitably adapted typewriter, is used to read into the display store 6 information defining the initial addresses of the characters stored in the store 5 together with suitable control words and information defining the size of the characters to be drawn, the spacing between characters and the initial position of the first character to be drawn.

When it is desired to display the information contained in the display store 6 a first control word is entered in the control register 9 together with an initial address for the display store 6. The control logic 10 causes the specified address to be read into the control register 9 and this address contains a second control word signifying that the information is to be displayed together with information defining the matrix size of the display i.e. the number of characters per line and the number of lines in the display. The control logic 10 then causes the information contained in the next address in the display store 6 to be read into the control register 9 and this address contains a third control word signifying that the display is to be tabular together with information defining the position of the first character in the display. The positional information is decoded and applied to the character decoding means 11 which causes deflection potentials to be applied to the scan amplifiers 12 and 13 to position the electron beam of the cathode-ray tube 1 to the required starting position on the screen. The control logic 10 then causes the information contained in the next address in the display store 6 to be read into the control register 9. The twenty-four bit word at this address contains the initial addresses in the data store 5 of the first three characters to be displayed together with information defining whether the character is to be displayed full or half size. This information is shifted into a separate address store within the control logic 10 which then causes the block of information within the data store 5 defined by the first address to be read into the control register 9 word by word. Each word contains information defining two lines to be drawn and this information is decoded line by line by the character decoding means 11 which causes the appropriate deflection potentials to be applied to the scan amplifiers 12 and 13 to draw the required character. The word containing the information defining the last line of the character also contains a termination bit signifying that the character has been completed and upon detection of the termination bit by the control logic 10 the electron beam is caused to move to the position for the next character and the information contained at the next address contained in the address store is then read into the control register 9 word by word until the termination bit is detected whereupon the information contained in the third address contained in the address store is read into the control register 9. After the third character has been displayed the information contained at the next address in the display store 6 is read into the control register 9 and if this contains the addresses of three further characters to be displayed the three characters are displayed in the manner described above. After the address of the last character to be displayed, the first control word is inserted in the display store 6 together with an address in the display store 6. For the period during which the display is fixed this address is the initial address for the display store 6 described above. This control word is then read into the control register 9 and the whole display is repeated. In this manner the information defining the characters to be displayed contained in the data store 5 is cyclically read into the decoding means 11 in accordance with the addresses contained in the display store 6 to cause the display of the desired characters.

When it is desired to change the display the information contained in the display store 6 may be changed by means of the display input device 8 or if the information already being displayed is likely to be required again a new address may be entered with the first control word such that a new display defined by other addresses in the display store 6 may be displayed. Similarly if it is desired to change the type of characters to be displayed the information defining the characters contained in the character data store 5 may be changed by means of the character data input device 7.

FIGURES 2, 3 and 4 are more detailed block diagrams of the control logic 10. This has been shown in three figures for clarity but the connections to any part having the same reference numeral in the three figures are all made to the one part. Referring now to FIGURE 2 of the drawings the seven most significant bits of the twenty-four bit control register 9 are connected to the input of a control word detector 21. The detector 21 has four outputs operative according to which control word is detected. These are TABULAR DISPLAY, INHIBIT, MATRIX CODE and DISPLAY ADDRESS. The output INHIBIT is the staticised inverse of the output TABULAR DISPLAY, the inversion being obtained by means of an invertor and staticisor 22. The detector 21 has one further output NO CONTROL WORD which is operative when no control word is contained in the seven most significant bits of the control register 9.

The eighth, ninth and tenth most significant bits of the control register 9 are connected as one group of inputs to a matrix size detector 23 which has a further input connected to the output MATRIX CODE of the detector 21, and the twelve least significant bits of the control register 9 are connected as one group of inputs to a display and data address store 24 which has a control input connected to the output DISPLAY ADDRESS of the detector 21 and a twelve bit output connected to the display store 6 (FIGURE 1).

The thirteenth to sixteenth least significant bits of the control register 9 are connected as one group of inputs to a data store block address store 25 which has a control input connected to the output DISPLAY ADDRESS of the detector 21 and a four bit output DATA BLOCK.

Referring now to FIGURE 3 of the drawings the eight least significant bits of the control register 9 are also connected via a gate 26 to the input of an eight-bit counter 27 which has an output connected to the input of a digital-to-analogue convertor 28 which has an output X. Similarly, the ninth to sixteenth least significant bits of the control register 9 are connected via a gate 29 to the input of an eight-bit counter 30 which has an output connected to the input of a digital-to-analogue convertor 31 which has an output Y. The output TABULAR DISPLAY from the detector 21 (FIGURE 2) is connected to the control inputs of the gates 26 and 29.

The counters 27 and 30 each have a further input connected to separate outputs of a character space control unit 32 which has one input connected to the output of a subscript staticisor 33 and a further input connected to the output MATRIX SIZE from the matrix size detector 23 (FIGURE 2). The counter 27 has a further input connected to the output of a terminal bit detector 34 and there is an output from the counter 27 connected to an input of the counter 30.

Referring now to FIG. 4 of the drawings the eight most significant bits of the control register 9 are also connected via a gate 35 to the eight least significant bits of the twelve-bit display and data address store 24 and the four most significant bits of the store 24 are connected via a gate 36 to the four bit output DATA BLOCK from the data store block address store 25 (FIGURE 2). The twelve bits of the store 24 are connected to the character data store 5 (FIGURE 1). The store 24 has a further output connected via a gate 37 to the input of a next display address store 38 which has an output connected via a gate 39 to one input to the store 24. A one bit adder 40 actuated by either of two inputs, DISPLAY TRANSFER COMPLETE or DATA TRANSFER COMPLETE, has its output connected to a second input to the store 24. The least significant bit of the store 24 is also connected to the input of the subscript staticisor 33.

The sixteen least significant bits of the control register 9 are connected via a gate 41 to a sixteen-bit auxiliary store 42. The store 42 has one output connected via a gate 43 to the third input to the display and data address store 24. The gate 43 has a single control input connected to one output of a character counter 44 which has one input connected to the output of the terminal bit detector 34.

The character counter 44 has a zero output which is operative when the counter 44 is at zero and this output is connected to the input of an invertor 45. The zero output of the counter 44 is also connected via a gate 46 to a further input to the counter 44.

The gates 35, 36, 37, 39 and 41 each have two control inputs and one control input for each of these gates is connected to the zero output from the character counter 44. The second control input to the gate 39 is connected to the output of the terminal bit detector 34 and the second control input of each of the gates 35, 36, 37 and 41 is connected to the output NO CONTROL WORD of the control word detector 21 (FIGURE 2).

The gate 46 also has two control inputs, one of which is connected to the output NO CONTROL WORD and the other of which is connected to the input DATA TRANSFER COMPLETE.

FIGURE 5 is a more detailed block diagram of the character decoding means 11 shown in FIGURE 1. Referring now to FIGURE 5 the least significant bit of the control register 9 is connected via a gate 47 to the input to the terminal bit detector 34. The second least significant bit of the control register 9 is connected as one control input to a brilliance control unit 48 the output of which is connected to the control grid 4 of the cathode-ray tube 1. The brilliance control unit 48 has a second control input connected to the zero output of a four-bit counter 49 which is operative when the counter 49 is at zero. One group of inputs to the counter 49 is connected via a gate 50 to the third to sixth least significant bits of the control register 9 and a further input to the counter 49 is connected to a source of clock pulses 51. The gates 47 and 50 each have two control inputs one input of each being connected to the output of the invertor 45, FIGURE 4, and the other input of each being connected to the zero output of the counter 49. The seventh to tenth least significant bits of the control register 9 are connected to two sets of the fixed contacts of two groups of change over contacts of a relay X MAX. For the sake of clarity this has been shown as an electromechanical relay but in practice the relay is an electronic relay. The eleventh least significant bit of the control register 9 is connected to the other two sets of fixed contacts of the change over contacts of the relay X MAX and the twelfth least significant bit of the control register 9 is connected to the control of the relay X MAX. The movable contacts of the change over contacts of the relay X MAX are connected to the inputs to two digital-to-analogue convertors 52, 53. The convertor 52 has an output $x$ connected to the input of an integrating amplifier 54 the output of which is connected to one input of a character size control unit 55. The size control unit 55 has a second input connected to the output of the subscript staticisor 33, FIGURE 4, and the output of the size control unit 55 is connected to one input of a summing amplifier 56. The second input to the summing amplifier 56 is connected to the output X of the digital-to-analogue convertor 28, FIGURE 3, and the output of the summing amplifier 56 is connected to the input to the scan amplifier 12 the output of which is connected to the scan coil 2 of the cathode-ray tube 1. Similarly, the convertor 53 has an output $y$ connected to the input of an integrating amplifier 57 the output of which is connected to one input of a character size control unit 58. The size control unit 58 has a second input connected to the output of the subscript staticisor 33, FIGURE 4 and the output of the size control unit 58 is connected to one input of a summing amplifier 59. The second input to the summing amplifier 59 is connected to the output Y of the digital-to-analogue convertor 31, FIGURE 3, and the output of the summing amplifier 59 is connected to the input to the scan amplifier 13 the output of which is connected to the scan coil 3 of the cathode-ray tube 1. The output INHIBIT from the invertor and staticisor 22, FIGURE 2, is connected to inputs to the digital-to-analogue convertors 52, 53 which also have inputs connected to the zero output of the counter 49, and the output of the terminal bit detector 34 is connected to reset inputs of the integrating amplifiers 54, 57.

The twelve most significant bits of the control register 9 are connected to the twelve least significant bits via a gate 60 the control input of which is connected to the output of a one-bit counter 61. The input to the counter 61 is connected to the zero output of the counter 49.

Figure 6:
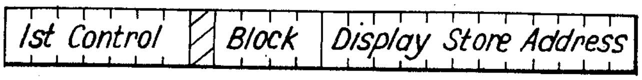

As previously stated, when it is desired to display the information contained in the display store 6 a first control word is entered in the control register 9 together with an initial address for the display store 6. The twenty-four bit word now held in the control register 9 is shown in FIGURE 6 from which it will be seen that the first control word is contained in the seven most significant bits of the control register 9 and the address for the display store 6 is contained in the twelve least significant bits. The thirteenth to sixteenth least significant bits contain information identifying a particular block of information within the data store 5, FIGURE 1. The remaining bit is unused. Detection of the first control word by the control word detector 21, FIGURE 2, causes an output on the DISPLAY ADDRESS line which enables the display and data address store 24 to receive the address contained in the twelve least significant bits of the control register 9 and also enables the data store block address store 25 to receive the block address contained in the thirteenth to sixteenth least significant bits of the control register 9. There is zero output on the output lines MATRIX CODE, NO CONTROL WORD AND TABULAR DISPLAY. The gates 26, 29, FIGURE 3 are therefore closed and the contents of the control register 9 are not entered in the counters 27, 30. The gates 35 and 41, FIGURE 4, are also closed and the information contained in the eight most significant bits of the control register 9 is not entered into the display and data address store 24 and no information is entered in the auxiliary store 42. The gate 46, FIGURE 4, is also closed and the chararter counter, which is at zero, remains at zero and therefore the gate 43 is closed, as also is the gate 50, FIGURE 5. Also, the operation of the digital-to-analogue convertors 52, 53, FIGURE 5, is inhibited and there is therefore no output $x$ or $y$.

When the address is entered in the store 24 the twenty-four bit word contained at that address in the display store 6 is read into the control register 9. This word contains a second control word signifying that the information is to be displayed together with information defining the matrix size of the display. When the transfer of this twenty-four bit word into the control register 9 is complete a "one" is added to the address contained in the store 24 to define the next address in the display store 6.

Figure 7:
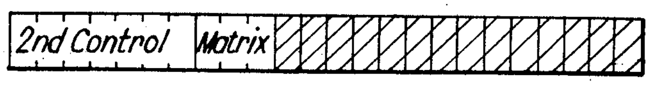

The twenty-four bit word now held in the control register 9 is shown in FIGURE 7 from which it will be seen that the second control word is again contained in the seven most significant bits of the control register 9 and the information defining matrix size is contained in the eighth, ninth, and tenth most significant bits, the remaining fourteen bits being unused. Detection of the second control word by the control word detector 21 causes an output on the MATRIX CODE line which enables the matrix size detector 23 to receive the matrix size information contained in the control register 9. The first two bits of the three bits of matrix size information are used to determine whether the matrix shall have eight, sixteen or thirty-two lines and the third bit is used to determine whether each line shall contain sixteen or thirty-two full size charatcers. This information causes an output from the matrix size dectetor 23 on the output line MATRIX SIZE which is applied to the character space control unit 32, FIGURE 3. There is again zero output from the control word detector 21 on the output lines NO CONTROL WORD and TABULAR DISPLAY and there is an output on the output line INHIBIT. There is also now zero output on the output line DISPLAY ADDRESS and no new information may be transferred from the control register 9 to the stores 24 and 25.

When the transfer of information to the matrix size detector 23 is complete the twenty-four bit word contained at the next address in the display store 6 is read into the control register 9. This word contains a third control word signifying that the display is to be tabular together with information defining the position of the first character in the display. When the transfer of this twenty-four bit word into the control register 9 is complete a "one" is added to the address contained in the store 24 to define the next address in the display store 6.

Figure 8:
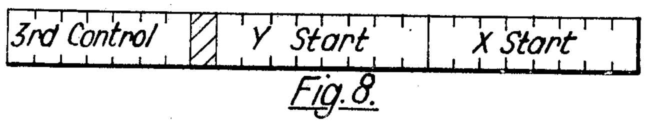

The twenty-four bit word now held in the control register 9 is shown in FIGURE 8 from which it will be seen that the third control word is contained in the seven most significant bits of the control register 9, the start position in the X direction for the first character is contained in the eight least significant bits and the start position in the Y direction is contained in the ninth to sixteenth least significant bits, the remaining bit being unused. Detection of the third control word by the control word detector 21, FIGURE 2, causes an output on the output line TABULAR DISPLAY and therefore zero output on the output line INHIBIT and this output is staticised by the invertor and staticisor 22 until a further control word is detected. There is zero output on the output lines NO CONTROL WORD, MATRIX CODE and DISPLAY ADDRESS which prevents transfer of information from the control register 9 into the matrix size detector 23 or the stores 24 and 25. The output on the TABULAR DISPLAY line opens the gates 26, 29, FIGURE 3, which permits the transfer of the information defining the start positions in the X and Y directions into the counters 27 and 30 respectively which are set accordingly. The eight bits defining the start position in each of the X and Y directions permits the selection of any one of two hundred and fifty-six start positions in each direction and the information set into the counters 27 and 30 is applied to the digital-to-analogue convertors 28 and 31 causing these to give corresponding analogue outputs X and Y. These outputs are applied to the summing amplifiers 56 and 59, FIGURE 5, causing the positioning of the electron beam of the cathode ray tube 1 to the required start position. There is zero output from the brillance control unit 48 and there is therefore no spot on the screen on the cathode-ray tube 1.

The zero output on the output line INHIBIT from the invertor and staticisor 22, FIGURE 2, means that the digital-to-analogue convertors 52, 53, FIGURE 5 are no longer inhibited from this source but they are still inhibited from operating by a zero output from the counter 49. There is therefore no second input to the summing amplifiers 56 and 59.

When the transfer of information to the counters 27 and 30 is complete the twenty-four bit word contained at the next address in the display store 6 is read into the control register 9. This word contains the initial addresses in the data store 5 of the first three characters to be displayed together with infromation defining whether the characters are to be displayed full or half size. When the transfer of this twenyt-four bit word into the control register 9 is complete a "one" is added to the address contained in the store 24.

The twenty-four bit word now held in the control register 9 is shown in FIGURE 9 from which it will be seen that the information for each character occupies eight bits of the control register 9 of which the seven most significant bits are the initial address of the character in the required block of data in the data store 5 and the least significant bit is a subscript S which is a zero if the character is to be full size or a "one" if the character is to be half size.

Since there is no control word held in the control register 9 there is zero output on the output lines TABULAR DISPLAY, MATRIX CODE and DISPLAY ADDRESS. There is however, an output on the output line NO CONTROL WORD and the character counter 43 is at zero and there is therefore an output on the zero output line from the counter 44. The gate 37 is therefore opened and the next address contained in the store 24 is shifted into the next display address store 38. The gates 35, 36, 39 and 41 are also opened and the sixteen least significant bits of the control register 9 are entered into the sixteen bits of the auxiliary store 42 and the eight most significant bits of the control register 9 are entered into the eight least significant bits of the store 24, the four bits from the data store block address store 25, FIGURE 2, being entered into the remaining four bits of the store 24 via the gate 36.

When the data store address of the first character is entered in the store 24 the twenty-four bit word held at this address in the data store 5 is read into the control register 9. This word contains information defining the first two lines of the first character to be drawn. When the transfer of this twenty-four bit word from the data store 5 is complete a "one" is added to the seven bit address contained in the store 24 to define the next address in the data store 5, the subscript bit S remaining unchanged. Also, the gate 46, FIGURE 4, is opened and since the character counter 44 is at zero there is an output on the zero output line and the counter 44 is therefore advanced to one. This closes the gates 35, 36, 37, 39 and 41, and opens the gate 50, FIGURE 5.

The twenty-four bit word now held in the control register 9 is shown in FIGURE 10 from which it will be seen that the information defining the first line to be drawn is contained in the twelve least significant bits of the control register 9 and the information defining the second line is contained in the twelve most significant bits. Of the twelve bits defining each line the least significant bit *t* is a terminal bit which is normally a zero but which is set to a "one" to indicate the last line in a character. The second least significant bit *b* is a brilliance control bit which is normally a zero but which is set to a "one" to blank out the line on the screen of the cathode-ray tube when it is desired to move the electron beam from one point on a character outline to another point to enable a further part of the character outline to be drawn. The angle at which each line is drawn is determined by applying a maximum deflection gradient to the electron beam to move it with a maximum velocity component in the X or Y direction and simultaneously applying one of sixteen possible deflection gradients having values up to the maximum value to give the velocity component in the orthogonal direction. The most significant bit Q of the twelve bits is set to a zero if the maximum velocity is required in the X direction or to a "one" if the maximum velocity is required in the Y direction and the second most significant bit P is set to a zero if the maximum velocity is to be positive or to a "one" if the maximum velocity is to be negative. The third to sixth most significant bits X/Y VELOCITY determine which of the sixteen possible deflection gradients are to be applied to the electron beam in the direction orthogonal to that defined by the most significant bit Q. The length of the line is determined by controlling the time for which the line is drawn and the remaining four bits TIME of the twelve bits defining the line indicate one of sixteen possible times for which the line is to be drawn.

The most significant bit Q of the twelve bits defining the first line to be drawn is applied to the relay X MAX. Assuming this bit to be a zero the relay contacts are in the position shown and the second most significant bit P is applied to the digital-to-analogue convertor 52, the next four most significant bits X/Y VELOCITY being applied to the digital-to-analogue convertor 53. The four bits TIME are set into the counter 49 and there is therefore no output on the zero output line from this counter. The bit *b* is applied to the brilliance control unit 48 and assuming this to be zero the brilliance control unit operates to brighten the spot on the screen of the cathode-ray tube 1. The counter 49 is now run down to zero by means of clock pulses from the clock pulse source 51. During this time the outputs *x*, *y* from the digital-to-analogue converters 52, 53 are applied to the integrating amplifiers 54, 57 and the outputs from these are applied via the size control units 55, 58 to the summing amplifiers 56, 59 where they are added to the outputs X, Y from the digital-to-analogue convertor 28, 31, FIGURE 3. The size control units 55, 58 are controlled by the output from the subscript staticisor 33, FIGURE 4 and determine whether full or half size character deflection gradients are applied to the electron beam according to whether the subscript S is a zero or a "one."

When the counter 49 reaches zero there is an output on the zero output line from this counter and the brilliance control is operated to blank out the spot on the screen of the cathode-ray tube 1. The digital-to-analogue convertors 52, 53 are also inhibited from operating and the outputs of the integrating amplifiers are held at their existing values. Also when the counter 49 reaches zero the counter 61 is advanced by one and the gate 60 is opened. The twelve most significant bits of the control register 9 are then transferred to the twelve least significant bits and the next line is drawn in a similar manner. If the most significant bit Q of this line is a "one" the relay X MAX is operated to change the contacts to the position opposite to that shown such that the bit P is applied to the digital-to-analogue converter 53 and the four bits X/Y VELOCITY are applied to the digital-to-analogue convertor 52. Also, if the bit *b* is a one the brilliance control unit 48 operates to blank out the spot and this line is not visible on the screen of the cathode-ray tube 1.

When the counter 49 reaches zero the counter 61 is advanced by one and the gate 60 is closed. The twenty-four bit word at the address in the data store 5 held in the score 24, FIGURE 4, is then read into the control register 9 and this word contains the information defining the next two lines to be drawn. Then the transfer of this twenty-four bit word is complete a "one" is added to the address contained in the store 24 to define the next address in the data store 5 the subscript bit S still remaining unchanged. The next two lines are then drawn and this process is continued until a terminal bit is detected by the terminal bit detector 34 denoting the last line of the character.

The output from the terminal bit detector 34 occurs when the counter 49 reaches zero after drawing the last line of the charatcer. The output from the detector 34 operates the character counter 44, FIGURE 4, causing an output which opens the gate 43. This permits the next character address and subscript contained in the eight most significant bits of the auxiliary store 42 to be transferred to the eight least significant bits of the store 24, the four-bit block address remaining the same. The output from the terminal bit detector 34 is also applied to the integrating amplifiers 54, 57, FIGURE 5, to reset them to zero ready for the start of the next character, and to the counter 27, FIGURE 3, to step it on by one or two units according to the input to the counter 27 from the character space control unit 32 which is determined by the output from the subscript staticisor 33. The new value contained in the counter 27 is applied to the digital-to-analogue convertor 28 causing an output which is applied to the summing amplifier 56, FIGURE 5. The output from the amplifier 56 causes the electron beam of the cathode-ray tube 1 to be deflected to the start position of the next character. The next character is then drawn in the same manner as described above.

When the terminal bit detector 34 is again operated when drawing the last line of the second character the character counter 44 again gives an output which opens the gate 43 and the third character address and subscript are transferred to the eight least significant bits of the store 24 and the electron beam of the cathode-ray tube 1 is moved to the start position for the third character. The third character is then drawn and when the terminal bit detector 34 is operated for a third time the character counter 44 returns to zero causing an output on its zero output line which closes the gates 47 and 50, FIGURE 5, and which, together with the output from the terminal bit detector 34, opens the gate 39. This permits the 12 bit address contained in the next display address store 38 to be transferred to the store 24 and the twenty-four bit word contained at this address in the display store 6 is read into the control register 9. This word contains the initial addresses in the data store 5 of the next three characters to be displayed together with the subscripts defining whether the characters are to be displayed full or half size. When the transfer of this word into the control register 9 is complete a "one" is added to the address contained in the store 24 and this next address is shifted into the next display address store 38. Operation of the terminal bit detector 34 for the third time also causes the electron beam of the cathode-ray tube 1 to be moved to the start position of the fourth character. The next three characters are then drawn in the manner described above.

At the end of the required number of characters in a line as determined by the matrix size detector 23, FIGURE 2, an output from the counter 27, FIGURE 3, is applied to the counter 30 and the counter 27 returns to zero. The new values in the counter 27 and 30 are applied to the digital-to-analogue converters 28 and 31 the outputs from which are applied to the summing amplifiers 56 and 59, FIGURE 5. The output from the amplifiers 56 and 59 cause the electron beam of the cathode-ray tube 1 to be deflected to the start position of the first character in the next line.

The process described above is repeated until all of the required characters in the display have been drawn. The next address in the display store 6 after the address containing the initial address of the last character required to be displayed contains the first control word together with the initial address for the display store 6. Therefore, after the last character has been drawn the twenty-four bit word contained at this address is read into the control register 9, the contacts of which are then as shown in FIGURE 6. Detection of the first control word by the control word detector 21, FIGURE 2 causes an output on the output line DISPLAY ADDRESS, zero output on lines NO CONTROL WORD, MATRIX CODE and TABULAR DISPLAY and an output on the output line INHIBIT. Thereafter the whole display is repeated, the repetition rate being selected to avoid flicker on the screen of the cathode-ray tube 1.

As previously stated, when it is desired to change the display the information contained in the display store 6 may be changed or if it is desired to display a new block of characters already stored in the display store 6 the initial address of the new block may be entered with the first control word instead of the initial address of the current display. Similarly, if it is desired to change the type of characters to be displayed a new block address may be entered with the first control word, the new address relating to a new block of information defining the required different characters held in the data store 5. Alternatively, the information defining the characters contained in the character data store 5 may be changed by means of the character data input device 7. In order that these changes may be made it is necessary that the character data store 5 and the display store 6 be of a kind such that the information stored may readily be changed as opposed to storage devices of the kind in which the information is permanently stored such as a core store in which the output is determined by permanently threaded wires.

In the system described above the characters have been drawn by defining lines joining points on the character outline. Other methods of defining the character may be used and FIGURE 11 shows a modified decoding means for use in a system in which the characters are defined by defining points on the character outline, the electron beam of the cathode-ray tube 1 being caused to move in a straight line between the defined points. Referring now to FIGURE 11, the least significant bit of the control register 9 is connected to the terminal bit detector 34 via a gate 47 as in the previous example. The second to fourth least significant bits are connected via a gate 62 to the input of a digital-to-analogue convertor 63 which has an output *b* connected to the control grid of the cathode-ray tube 1. The fifth to eighth least significant bits are connected via a gate 64 to the input of a digital-to-analgoue convertor 65 which has an output *y* connected to the input of an integrating amplifier 66, and the ninth to twelfth least significant bits are connected via a gate 67 to the input to a digital-to-analogue convertor 68 which has an output *x* connected to the input of an integrating amplifier 69. The gates 62, 64, 67 each have a single control input connected to the output of the invertor 45, FIGURE 4.

The input to the one-bit counter 61 is connected to the output of a timer 67 and the remainder of the decoding means is as shown in FIGURE 5.

In this modified system the twenty-four bit words read into the control register 9 from the data store 5 are as shown in FIGURE 12. From this it will be seen that each point is again defined by twelve bits of which the least significant bit *t* is again a terminal bit which is normally a zero but which is set to a "one" to indicate the last point in a character. The second to fourth least significant bits B are brilliance control bits which determine which of eight possible potentials are applied to the control grid 4 of the cathode-ray tube 1. The fifth to eighth least significant bits *y* determine one of sixteen possible positions in the *y* direction and the remaining four bits *x* determine one of sixteen possible positions in the *x* direction. Thus the points on the character outline are selected from a sixteen by sixteen point grid.

The gates 62, 64, 67 are only open when the character counter 44, FIGURE 4, is not at zero and when this is so the four bits *x* are applied to the digital-to-analogue convertor 68 causing it to give an output *x* which is applied to the integrating amplifier 69 and the four bits *y* are applied to the digital-to-analogue convertor 65 causing it to give an output *y* which is applied to the integrating amplifier 66. The output from the amplifiers 66 and 69 are fed via the size control units, summing amplifiers and scan amplifiers to the deflection coils of the cathode-ray tube 1. In this way the electron beam is caused to move in a straight line from one point to the next in a fixed time. Because of the fixed time method of operation it is necessary to control the brightness of the spot since the movement may be between any two points on the sixteen by sixteen point grid. The brightness control is achieved by means of the three bits B which are applied to the digital-to-analogue convertor 63 causing it to give an output *b* which is applied to the control grol of the cathode-ray tube 1. This output is arranged such that when the three bits B are all zero the spot is blanked out on the screen of the cathode-ray tube. Also, since each line is drawn in a fixed time the transfer of the twelve most significant bits of the control register 9 into the twelve least significant bits thereof is arranged to occur after a fixed time interval during which the first line is drawn. The timer 67 is therefore set to give an output after the fixed time interval has elapsed and is triggered at the start of drawing each line. The gate 60 is therefore opened to allow the transfer of alternate point information from the twelve most significant bits to the twelve least significant bits of the control register 9.

The remainder of the system operates in the same manner as described in the previous example.

What we claim is:

1. An electronic display system comprising a cathode-ray tube, a first addressable storage means for storing a plurality of blocks of digital information, each of said blocks, comprising information defining a character to be displayed, a second storage means for storing the initial address of each of said blocks of information defining the characters which it is desired to display, said first and said second storage means being of a kind such that the information stored may readily be changed, decoding means for converting digital information into deflection signals for controlling the deflection of the beam of said cathode-ray tube, and control means for cyclically reading into said decoding means for required blocks of information from said first storage means in accordance with the addresses contained in said second storage means to cause the display of the desired characters.

2. An electronic display system as claimed in claim 1 in which the decoding means include means for defining said characters by defining lines joining points on the character outline, means for determining in which of two mutually orthogonal directions the electron beam of said cathode-ray shall be deflected with a maximum velocity component and with which of a number of velocity components said electron beams shall be simultaneously deflected in the order of said two directions to define each line, and means for determining the duration of such deflection.

3. An electronic display system as claimed in claim 2 in which each of said blocks of information comprises a plurality of words, each word defining at least one line of a character.

4. An electronic display system as claimed in claim 3 in which said decoding means comprises first and second digital-to-analogue convertors for receiving digtal information derived from words from said first storage means, first and second integrating amplifiers having their inputs respectively connected to the outputs of said first and second digital-to-analogue convertors, and means for causing the outputs of said first and second integrating amplifiers to control the deflection of said electron beam in said two mutually orthogonal directions.

5. An electronic display system as claimed in claim 4 including timing means for controlling the operation of said first and second digital-to-analogue convertors to determine the duration of the deflection of said electron beam.

6. An electronic display system as claimed in claim 5 in which said timing means includes a digital counter adapted to be set to a value for each line derived from a word from said first storage means, and clock means for running said counter to zero.

7. An electronic display system as claimed in claim 2 including brilliance control means for determining whether or not the trace of said electron beam on the screen of said cathode-ray tube is visible.

8. An electronic display system as claimed in claim 1 in which said characters are defined by defining points on the character outline between which the electron beam of said cathode-ray tube is required to move in a straight line.

9. An electronic display system as claimed in claim 8 in which each of said blocks of information comprises a plurality of words, each word defining at least one point on the character outline.

10. An electronic display system as claimed in claim 9 in which said decoding means comprises first and second digital-to-analogue convertors for receiving digital information derived from words from said first storage means, first and second integrating amplifiers having their inputs respectively connected to the outputs of said first and second digital-to-analogue convertors, and means for causing the outputs of said first and second integrating amplifiers to control the deflection of said electron beam in two mutually orthogonal directions to cause said electron beam to move between consecutive points on the character outline.

11. An electronic display system as claimed in claim 8 including brilliance control means for controlling the brilliance of the trace of said electron beam on the screen of said cathode-ray tube in accordance with the distance between consecutive points on the character outline.

12. An electronic display system as claimed in claim 1 in which said first and second storage means are core stores.

References Cited

UNITED STATES PATENTS

| | | | |
|---|---|---|---|
| 3,205,344 | 9/1965 | Taylor et al. | 340—324.1 |
| 3,241,120 | 3/1966 | Amdahl | 340—324.1 |
| 3,305,841 | 2/1967 | Schwartz | 340—324.1 |
| 3,329,947 | 7/1967 | Lorrowe | 340—172.5 |
| 3,394,367 | 7/1968 | Dye | 340—324.1 |

JOHN W. CALDWELL, Primary Examiner

M. M. CURTIS, Assistant Examiner

U.S. Cl. X.R.

278—15, 26; 235—154

PO-1050
(5/69)

UNITED STATES PATENT OFFICE
CERTIFICATE OF CORRECTION

Patent No. 3,500,470 Dated March 10, 1970

Inventor(s) Keith S. Barker et al.

It is certified that error appears in the above-identified patent and that said Letters Patent are hereby corrected as shown below:

Column 7, line 49, "infromation" should read --information--; line 51, "twenyt-four" should read --twenty-four--. Column 11, line 6, "analgoue" should read --analogue--; line 73, delete the comma. Column 12, line 7, "for" should read --the--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents